UNITED STATES PATENT OFFICE.

WALTER H. DICKERSON, OF MUSKEGON, MICHIGAN.

MANUFACTURE OF ADHESIVES OR BINDERS.

1,290,118.     Specification of Letters Patent.     Patented Jan. 7, 1919.

No Drawing.     Application filed January 10, 1913. Serial No. 741,215.

*To all whom it may concern:*

Be it known that I, WALTER H. DICKERSON, a citizen of the United States, residing at Muskegon, in the county of Muskegon and State of Michigan, have invented certain new and useful Improvements in the Manufacture of Adhesives or Binders, of which the following is a specification.

This invention relates to the manufacture or production of compositions of matter having adhesive or binding properties from liquors such as result from the manufacture of paper pulp cellulose by the sulfite process, which liquors are commonly termed "waste sulfite liquor" or "waste liquor".

All processes in use heretofore for the treatment of waste sulfite liquor for the production of an adhesive binder, particularly for the use in binding sand together for the manufacture of cores in foundry work, have involved the neutralization of the waste liquor by means of milk of lime or caustic lime or other caustics, this neutralization being necessary because evaporation or concentration has been effected in iron evaporating apparatus. It has also previously been considered necessary to have waste sulfite liquor in a neutral or alkaline condition in order to evaporate it without decomposition.

I have now discovered, however, that a binding compound made from waste sulfite liquor which has been suitably concentrated but not neutralized or made alkaline by caustics or milk of lime, has superior binding qualities to those made from liquors which have been neutralized or made alkaline. I have found also that concentration or evaporation of acid reacting liquors and without decomposition thereof, can be effected in a copper lined vacuum evaporator, especially if the liquor is not heated too long during evaporation.

The straight waste sulfite liquor when concentrated in its natural condition gives a material having very good binding properties, such as are required for sand core apparatus, but it, at the same time, contains a high percentage of sulfurous acid. This high acid content is objectionable to the workman, either during the baking of the cores or during the pouring of the metal into the molds. The removal of this acid content by complete neutralization of the acids with a sufficient amount of caustic alkalis or excess thereof results in the production of inferior adhesive or binding compounds, however. This appears to be due to the fact that in neutralizing or making alkaline with caustic alkalis certain constituents of the waste sulfite liquor undergo certain alterations or changes. The deterioration of the compound as regards its binding property, resulting from such neutralization of the acids of the waste sulfite liquors, has been so great that it has been proposed and advised that certain other materials such as molasses, flour or glue should be added to the compound so as to increase its adhesive properties.

In order to produce adhesive or binding compounds from waste sulfite liquors, which do not require such additions of comparatively expensive material, and which have the superior effectiveness of concentrated acid waste sulfite liquors without the objectionable evolution of gases in actual use, I proceed as follows:—

I determine the acid content of the waste liquor and then add thereto, prior to or during evaporation, an amount of very weakly alkaline reacting compound, such as calcium carbonate, which is sufficient to neutralize practically all of the acid, leaving say 0.3 per cent. of unneutralized acid in the straight or partially concentrated liquors. In this way only the sulfurous acid of the liquor is neutralized, whereas the organic acids are retained in their natural state. Commercial calcium carbonate, or refuse lime cake carrying a high percentage of calcium carbonate, may be suitably used for this purpose, but barium carbonate or magnesium carbonate or any other relatively insoluble carbonate or similar suitable compounds, such as aluminum hydrate, could be used. Practical consideration dictates calcium carbonate as the best material because of its cheapness, for example.

Because of the insolubility or weakly alkaline nature of the reagents the liquor or resulting concentrated compound will always remain slightly acid and will not show any of the characteristics, such as darkening or decomposition, which follow neutralization or even partial neutralization with milk of lime or other caustic alkalis. The use of such alkalis invariably causes such decompositions as a result of the permanent alkalinity of the neutralized liquors or the temporary alkalinity thereof resulting from local overneutralization of portions of the liquor before stirring is completed. I avoid such temporary or permanent overneutralization of the liquors by using relatively insoluble, weakly acid compounds, such as carbonates, instead of caustic alkalis and in amounts not quite sufficient to neutralize all of the acids in the liquor.

In practice I employ various methods of carrying out this general procedure. Thus the waste liquor, as it is received hot from the digesters, may be treated with the proper amount of calcium carbonate determined by analysis as above specified, and after the precipitation of insoluble calcium sulfite which will result has settled out, the resulting liquor may be evaporated, preferably in a vacuum evaporator, to a concentration of 30° Baumé, or so that it will contain 50% of solids; it will then be ready for use as a binding compound. Of course the evaporation could be carried to complete dryness whenever a solid compound which is afterward to be moistened or dissolved was considered preferable.

Instead of adding all of the calcium carbonate before evaporation, as above, the waste liquor may be partially concentrated to say 12° Baumé; the acid content may be then determined and a sufficient quantity of calcium carbonate be then added, followed by separation from the precipitate and completion of the evaporation as above described. This latter method of procedure is to be preferred, because in the first place much of the acid is removed from the liquor during preliminary evaporation in the form of sulfur-dioxid gas and with the result that less calcium carbonate is required to be added. In the second place the latter procedure is not accompanied to as great a degree by a precipitation of insoluble calcium compounds in the evaporator and consequent incrustation or scaling of the interior or tubes of the evaporator. If the calcium carbonate is added before any concentration whatsoever, the precipitation of insoluble calcium compounds is not so nearly complete outside of the evaporator, but occurs in part during the evaporation and with the consequence just mentioned.

Of course a portion of the total necessary amount of calcium carbonate determined by analysis may be added to the hot waste liquors before any evaporation, and the remaining portion of calcium carbonate may be added after partial evaporation to say 12° or even 30° Baumé. I do not find these two latter methods of procedure to be as satisfactory, however, as that just above explained.

The adhesive or binding compounds, or solutions thereof, obtained by my method do not require any addition of extraneous glutinous or sticky substances, nor further treatment with chemicals to separate adhesive or dextrin-like compounds from the products, such as have heretofore been proposed and considered necessary. My product is accordingly less expensive to manufacture although of equal or greater effectiveness than those heretofore known.

It may be used, of course, for any binding purposes, including use as a binding material for sand cores, and as a binding material for road construction or road dressing purposes. The product is characterized also by the fact that it is able to precipitate glue solutions.

Having thus described my invention, what I claim as new and desire to secure by Letters Patent, is:—

1. The method of treating waste sulfite liquor for the preparation of an adhesive product, which consists in adding a water insoluble neutralizing agent in an amount insufficient to neutralize all of the acid, and concentrating to a suitable degree.

2. The method of treating waste sulfite liquor for the preparation of an adhesive product, which consists in concentrating it to a suitable degree and adding during the concentration a water insoluble neutralizing agent in an amount insufficient to neutralize all of the acid.

3. The method of treating waste sulfite liquor for the preparation of an adhesive product, which consists in adding a water insoluble neutralizing agent in an amount insufficient to neutralize all of the acid, and concentrating in vacuo to a suitable degree.

4. The method of treating waste sulfite liquor for the preparation of an adhesive product, which consists in concentrating it in vacuo to a suitable degree and adding during the concentration a water insoluble neutralizing agent in an amount insufficient to neutralize all of the acid.

5. The method of treating waste sulfite liquor for the preparation of an adhesive product, which consists in adding calcium carbonate in an amount insufficient to neutralize all of the acid, and concentrating to a suitable degree.

6. In an adhesive product consisting of the concentrated and undecomposed constituents of an incompletely neutralized mass of waste sulfite liquor, characterized as having the organic constituents of the mass unaltered by having added to the liquor a water insoluble neutralizing agent, and by being substantially free from inorganic acids.

7. An adhesive product consisting of the concentrated and undecomposed constituents of an incompletely neutralized mass of waste sulfite liquor, characterized as having the organic and colloidal constituents of the mass unaltered by having added to the liquor a water insoluble neutralizing agent, and by being substantially free from inorganic acids.

8. An adhesive product consisting of the concentrated and undecomposed constituents of an incompletely neutralized mass of waste sulfite liquor, characterized as having the organic constituents of the mass unaltered by having added to the liquor a water insoluble neutralizing agent, and by being clearly soluble in water and substantially free from inorganic acids.

9. An adhesive product consisting of the concentrated and undecomposed constituents of an incompletely neutralized mass of waste sulfite liquor, characterized as having the organic and colloidal constituents of the mass unaltered by having added to the liquor a water insoluble neutralizing agent, and by being clearly soluble in water and substantially free from inorganic acids.

10. An adhesive product obtained from undecomposed waste sulfite liquor characterized as being a concentrated incompletely neutralized mass having the colloidal constituents unaltered by having added to the liquor a water insoluble neutralizing agent leaving the organic acids free, and by being substantially free from sulfurous acid.

11. An adhesive product obtained from undecomposed waste sulfite liquor characterized as being a concentrated incompletely neutralized mass having the colloidal constituents unaltered by having added to the liquor a water insoluble neutralizing agent leaving the organic acids free, and by being clearly soluble in water and substantially free from sulfurous acid.

In testimony whereof I affix my signature in the presence of two witnesses.

WALTER H. DICKERSON.

Witnesses:
L. S. PERRINE,
LAURA E. SMITH.